United States Patent [19]
Retter et al.

[11] Patent Number: 5,712,665
[45] Date of Patent: Jan. 27, 1998

[54] DYNAMIC RANDOM ACCESS MEMORY FOR MPEG DECODING

[75] Inventors: Refael Retter, Haifa; Moshe Bublil, Netanya; Gad Shavit, Givat Ella; Aharon Gill, Haifa, all of Israel

[73] Assignee: Zoran Microelectronics Ltd., Haifa, Israel

[21] Appl. No.: 661,135

[22] Filed: Jun. 10, 1996

Related U.S. Application Data

[63] Continuation of Ser. No. 245,465, May 18, 1994, abandoned.

[51] Int. Cl.$^6$ .................................................. G09G 5/00
[52] U.S. Cl. .................................... 345/203; 345/185
[58] Field of Search ........................... 345/185, 189, 345/192, 203; 395/507, 509; 348/714, 715

[56] References Cited

U.S. PATENT DOCUMENTS 5,289,577  2/1994  Gonzales et al.
5,398,072  3/1995  Auld ................................ 348/715

Primary Examiner—Regina D. Liang
Attorney, Agent, or Firm—Townsend and Townsend and Crew LLP; Henry K. Woodward

[57] ABSTRACT

A dynamic random access memory (DRAM) for use in MPEG decoding includes d devices each having r rows and c columns with b bits per cell and p samples, where b*d is divisible by 8 and r*c is larger than a sum of upstream buffers in bytes and either 2 or 3 times 1.5*1*p divided by (b*d/8). First and second reference picture components are organized first along a depth axis (d) and then along rows (r) with complete lines of a component occupying the same row with the memory region occupied by each component being rectangular and third reference signal components are organized first along a depth axis and then along rows and occupying a largest possible part of each row in multiples of 8*(8/(b*d)).

3 Claims, 1 Drawing Sheet

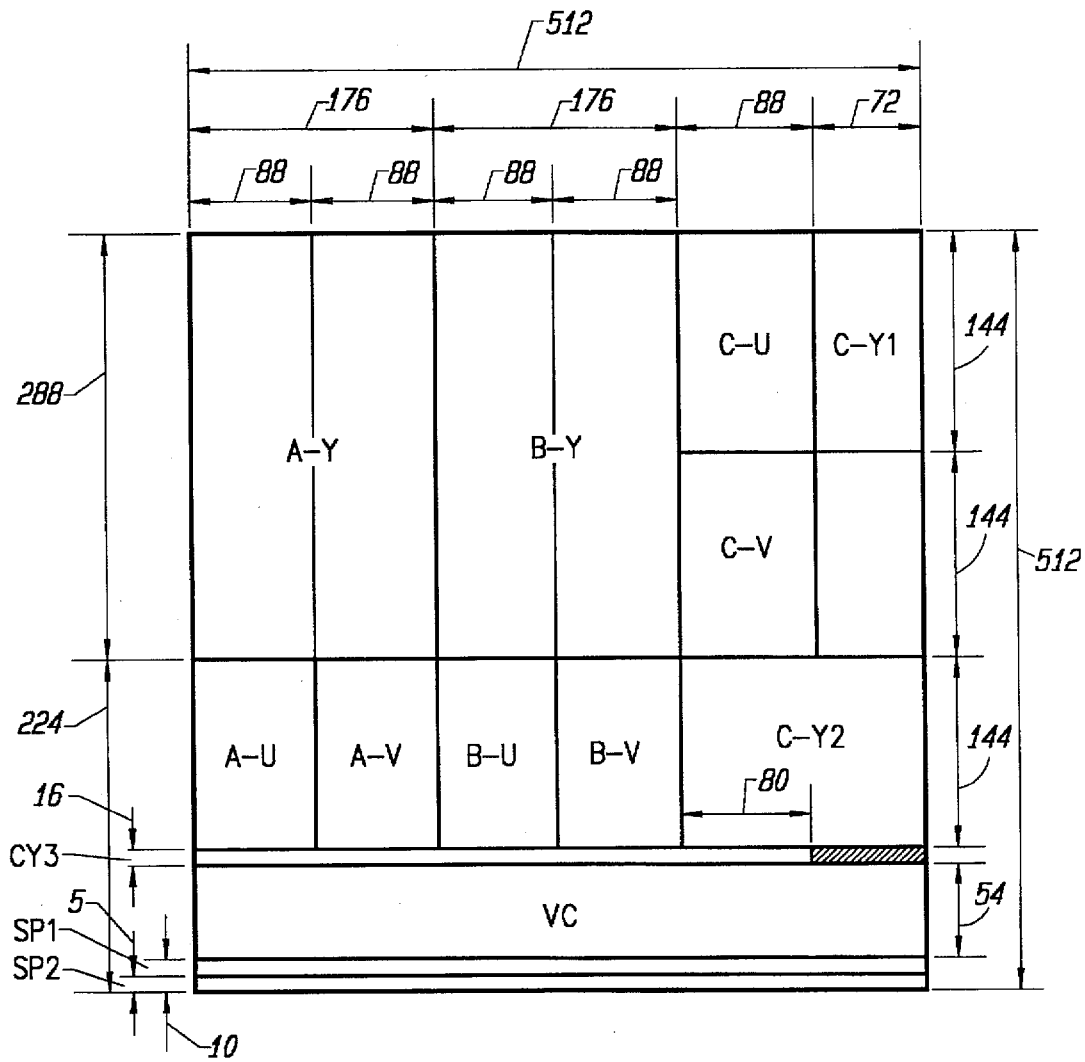

DYNAMIC RANDOM ACCESS MEMORY FOR MPEG DECODING

This is a Continuation of application Ser. No. 08/245,465, filed May 18, 1994, now abandoned.

BACKGROUND OF THE INVENTION

This invention relates generally to the encoding and decoding of multimedia data, and more particularly the invention relates to memory for use in a decoder of audio and video data which has been encoded in accordance with the MPEG (Motion Picture Experts Group) standard for full-motion video.

The MPEG decoding algorithm specifies several buffers for proper decoding. The first type of buffers are coded bitstream buffers. If the decoder decodes video only, than one coded bitstream buffer is needed. If the decoder decodes the multiplexed system bitstreams, then the number of coded bitstream buffers needed is equal to the number of bitstreams synchronized by the decoder. The second type of buffers are decoded pictures buffers used as reference data in the decoding process. Two picture buffers are needed for this purpose. When the coded pictures are progressive (as in the case in MPEG 1 and some subsets of MPEG 2) and the decoder has to support conversion of the decoded picture to interlaced display, at least a third picture buffer is needed.

Even for constrained MPEG I video bitstreams, the size of the needed coded video bitstream buffer (typically about 40 Kbytes) and SIF size picture buffers (typically about 125 Kbytes per picture) preclude a cost effective solution that supports the needed buffers inside the decoder. An external buffer completely controlled by the decoder is a better solution.

Of the common types of RAM devices (SRAM, VRAM and DRAM), the DRAM offers the most cost effective solution and indeed many of the decoders already implemented (e.g., C-cube, LSI and Motorola) use external DRAM buffers. The requirements of the DRAM structure and mapping of the various buffers to the DRAM address space, which are described below, pertain also to VRAMs as do the proposed solutions which are the subject of this patent.

MPEG and DRAM requirements: DRAMs has a rectangular organization of r rows time c columns times b bits cells, where r, c, and b, are powers of 2. The coded bitstreams are byte aligned.

A decoded picture is composed of three rectangular component: one (the Y component) is 1 line by p samples by 8 bits, and the other two (the U and V components) are ½ line by p/2 samples by 8 bits.

The DRAM organization issue is how to choose the DRAM devices (i.e., what specific (r,c,b) combination from all available and cost effective combinations) and how to map the coded bitstream buffers and the picture buffers into these DRAM devices.

The coded bitstream buffers are linear FIFO type write and read. The pictures are written in 8*8 sample blocks as they are decoded. Each of the two reference picture buffers are read in two different orders: One in 9*9 sample blocks for reference with origin at any pixel of the picture, and the other is for display in raster scan order. The third picture buffer (when needed) is read in display order only.

Most DRAMs have a special "page mode" read or write where consecutive transfer cells within the same row is much faster (about three times typically ) than a transfer of a random single cell. There is some overhead involved so that the larger the "page" (number of cells of the same row transferred consecutively) the smaller is the average time per transferred cell.

The DRAM implementation makes the transfer time per cell (either a single transfer or page mode transfer) almost independent of the cell bit depth - b. Hence the larger is b, the higher is the bit transfer rate.

If more than one device is needed, then it is more cost effective to implement with all the devices being of the same type and structure (i.e., same (r,c,b) combination). It is more cost effective to use the same address and control signals for all the devices.

The DRAM market trend is such that at each particular date, there is a DRAM size (r,c,b) with minimal price per bit. This size is constantly increasing. The row address and column address are multiplexed on the same DRAM pins. DRAM devices with r=c are more cost effective than otherwise.

Based on the above requirements, the present invention provides optimum memory organization.

SUMMARY OF THE INVENTION

In accordance with the invention, a dynamic random access memory comprises d devices, each having r rows and c columns with b bits per cell as follows:

Denote the number of DRAM devices chosen by d. Then, b,d should be divisible by 8. Also, b,d and the average transfer time per cell should be such that the required bit transfer rate will be achieved.

The number of cells per device (r*c) should be the smallest which is larger than: the sum of the bitstream buffers in bytes and 2 (or 3) times 1.5*1*p, divided by (b*d/8) .

Since b*d bits are transferred together, the coded bitstream should be organized first along the "depth" axis (i.e., in the cells of the same address in the various devices) and then along rows. It should occupy as large a part of each row as possible, preferably the whole row.

Since b*d bits are transferred together, the picture components samples of the two reference pictures, in raster order, should be organized first along the depth axis and then along rows. Complete lines of each component (or multiple lines) should occupy the same row. The shape of the region occupied by each component should be rectangular.

Since b*d bits are transferred together, the picture components samples of the third picture (if needed), in raster order, should be organized first along the depth axis and then along rows. It should occupy as large a part of each row as possible, in multiples of 8*(8/(b*d)) cells. A rectangular shaped region for each component is preferable. If this cannot be achieved, then the occupied region should be divisible to the smallest possible number of rectangles and the width (number of occupied cells in a row) of each should be a multiple of 8*(8/(b*d)) cells.

The invention and objects and features thereof will be more readily apparent from the following description and appended claims when taken with the drawing.

BRIEF DESCRIPTION OF THE DRAWING

The drawing illustrates an MPEG decoder memory organization in accordance with the invention.

DETAILED DESCRIPTION OF ILLUSTRATIVE EMBODIMENT

The specific example is an MPEG I system and video decoder that has to handle one video stream with picture size up to 352*288 and at least 46 Kbytes of code buffer, and two serial streams (audio or private) with at least 4 Kbytes buffer each. The device has to support interlaced output also.

The total number of bits needed is:

$$1024*(46+2*4)*8+3*1.5*352*288*8=4,091,904$$

For b,d=8 the number of cells needed is 511,488. For b*d=16 the number of cells needed is 255,744.

The most cost effective (in terms of cost per bit) DRAMs at the time of the design of this example are 1 Mbit and 4 Mbit DRAMs. The structures that can be found for the 1 Mbits Dram are 1K*1K*1, 512*512*4, 1K*256*4, 512*256*8. The structures that can be found for the 4 Mbits DRAM are 2K*2K*1, 1K*1K*4, 1K*512*8 and 512*512*16.

The 1 Mbit device with 512*512*4 structure and the 4 Mbit device with 512*512*16 structure fit the guidelines in the best way.

4 devices of 1 Mbit or 1 device of 4 Mbit are needed. In both cases r=c=512 and b*d=16. So, both devices can support the same organization and there is no need to distinguish between these two cases in the decoder design.

The following organization fits best the guidelines for this example:

a) Each of the 4 Kbytes buffer will occupy 4 complete rows (of 512 cells times 16 bits).

b) The 46 Kbytes buffer will occupy 46 complete rows (of 512 cells times 16 bits).

c) Each of the Y component of the two reference pictures will occupy 288 rows with 176 consecutive cells (times 16 bits).

d) Each of the U or V component of the three pictures will occupy 144 rows with 88 consecutive cells (times 16 bits).

e) Unfortunately, the Y component of the 3rd picture cannot be organized in such a regular fashion and it has to occupy a non-rectangular region of the DRAM. In this example it is divided into three rectangles.

f) The proposed organization leaves some complete rows free. These rows can be allocated to the coded bitstream buffers.

There are many ways in which all of the above-mentioned regions can be mapped on the 512*512 address space of the DRAM(s). One such particular mapping as implemented in the ZR36100 MPEG Decoder of Zoran Corporation, assignee, is shown in the attached figure. In this case, 8 more complete rows were allocated to the video code buffer and one more complete row were allocated to each of the serial code buffers.

In the figure, A designates one of the reference pictures, B designates the other reference picture, C designates the third picture, VC designates the video code buffer, and SP1 and SP2 are the serial code buffers.

There has been described one embodiment of an MPEG decoder memory in accordance with the invention. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A dynamic random access memory (DRAM) organized as at least one bitstream buffer for storing a plurality of bytes and at least one picture buffer for MPEG decoding, said DRAM comprising d memory devices, each device having r rows and c columns with b bits per cell and p picture samples, where b*d is divisible by 8, and r*c is larger than a sum of the size of the at least one bitstream buffer in bytes and one of 2 and 3 times 1.5*1*p divided by (b*d/8).

2. The dynamic random access memory as defined by claim 1, said memory storing first and second reference picture (A,B) components (U,V,Y) organized first along a device axis (d) and then along rows (r) with one or more complete lines of a reference picture component occupying the same row, with the memory region occupied by each component being rectangular.

3. The dynamic random access memory as defined by claim 2, said memory storing third reference picture (C) components (U,V,Y) organized first along a device axis and then along rows and occupying a largest possible part of each row in multiples of 8*(8/(b*d)).

* * * * *